Dec. 6, 1960  A. L. OBERG ET AL  2,963,003
INDOOR PET SAND BOX
Filed Feb. 11, 1958
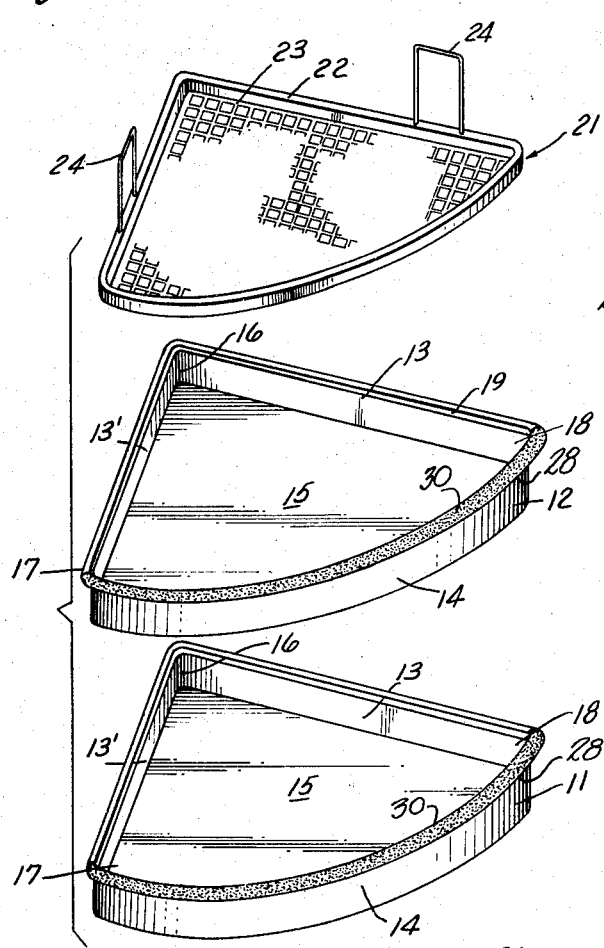
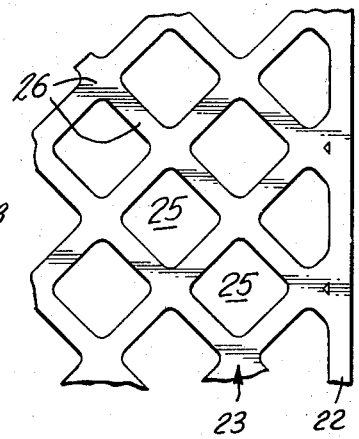
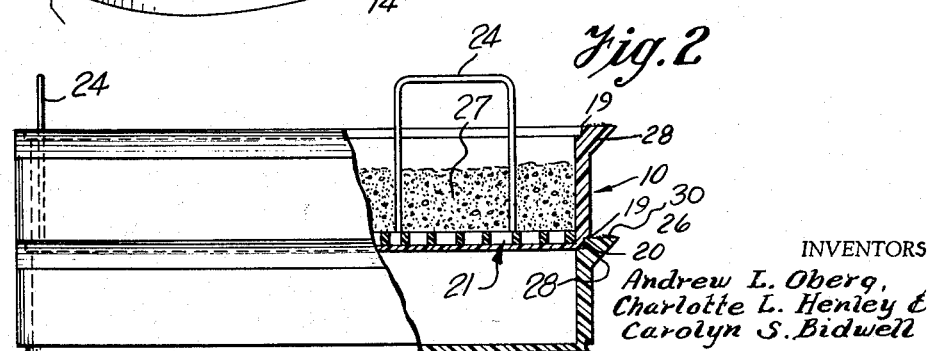
INVENTORS
Andrew L. Oberg,
Charlotte L. Henley &
Carolyn S. Bidwell
BY Mason, Fenwick & Lawrence
ATTORNEYS United States Patent Office 2,963,003
Patented Dec. 6, 1960

2,963,003

INDOOR PET SAND BOX

Andrew L. Oberg and Charlotte Louise Henley, both of 1010A Floyd Ave., Richmond 20, Va., and Carolyn Suzanne Bidwell, 913 Kent Road, Apt. 1, Richmond 19, Va.

Filed Feb. 11, 1958, Ser. No. 714,578

7 Claims. (Cl. 119—1)

This invention relates to an indoor receptacle for the excrement of pets, such as cats, frequently referred to as pet sand boxes, and more particularly to such a receptacle in which a sanitizing and deodorizing, absorbent type of material is employed.

Various types of granular materials are provided for use in indoor pet boxes for the purpose of sanitizing and deodorizing the excrement of the animals. This material becomes spent very quickly unless it is given regular periodic attention. The animal feces must be removed from the absorbent material, and the usual means for removing them is with paper, a scoop or a small strainer held in the hand. This granular material is usually a porous ground mineral, but may be of vegetable origin. It will be referred to herein as sand. Most cats cover their excrement and the feces are not seen, and therefore, not removed from the absorbent material. In time, the feces mold and become decayed, and the deodorizing quality of the sand is temporarily overcome.

The sand used in pet sand boxes requires stirring up periodically, to dry out areas made moist by urine. Since excess amounts of urine will seep to the bottom of the container, deep and thorough stirring of the mass of absorbent material is necessary to distribute the excess moisture throughout the material, so that it will be brought in contact with the greatest amount of the deodorizing sand, and being spread over a large area, it will dry faster. The wooden boxes used by many pet owners soon become foul-smelling, due to the absorptiveness of the wood; sheet iron boxes rust, and the rust absorbs the urine and produces a stench; and disposable cardboard boxes are seldom disposed of before the floor or floor covering has been damaged. The cleaning of any of these containers is a time consuming chore. Also, the shape of known containers makes them conspicuous and usually an impediment to persons moving about in the room. In addition, these containers have sharp, unstable or slippery top edges, and the animals soon learn that the sides of the box must be vaulted. In leaping over the sides of the box, the animals spread the sand about on the floor covering around the box.

Consequently, it is an object of the present invention to provide a pet sand box for the excrement of indoor pets, such as cats, from which all the feces whether concealed or not may be removed from the deodorizing material contained in the box in one simple, quick operation.

It is another object of the invention to provide such a box in which the box may be quickly restored to a sanitary condition after a period of use.

A further object of the invention is to provide a box having a safe footing for the pets on its entrance side, so that they will be inclined to enter and leave the box in an orderly manner, and will not vault the side of the box and scatter sand contained in the box, on the floor.

It is a still further object of the invention to provide a box which may be positioned in a room in such a manner that it will not impede movement of persons.

Other objects of the invention will become apparent to those skilled in the art, from the following description when read in conjunction with the accompanying drawing, wherein:

Figure 1 is an exploded perspective view of the pet sand box for the excrement of indoor pets, the parts being shown in their relationship to each other;

Figure 2 is a side elevational view of the box of the present invention, with the parts shown in Figure 1 interfitted to form the box, parts being broken away to show the structure; and Figure 3 is an enlarged fragmentary plan view of the separator of the present invention cast in plastic.

Adverting now to the figures, there is shown an indoor pet sand box 10, made in accordance with the present invention. A three-sided, quadrant-shaped base tray 11 supports a sand tray 12, which is used by trained household pets for the deposit of their excrement. The sand tray 12 is of identical size and configuration as the base tray 11. Each of the trays 11 and 12 has two rectilinear sides 13, 13', a curvilinear side 14, and a bottom 15, respectively. The sides 13, 13' of the trays 11 and 12 are joined at one of their ends as at 16, so that the sides 13, 13' extend from the jointure 16 at right angles. Each end of the curvilinear side 14 is joined to the sides 13, 13' as at 17 and 18. The trays 11 and 12 are made of an impervious rustproof material, for example, a synthetic resin plastic such as high impact styrol resin, or a non-corroding metal such as stainless steel. A rabbet 19 is provided around the inner periphery of the top edges of the sides 13, 13' and 14. A recessed ledge 20 extends around the outer periphery of the bottom edge of the sides 13, 13' and 14. The rabbet 19 and the ledge provide cooperating surfaces for nestingly supporting the trays 11 and 12 in vertical alignment, either one atop the other. Thus, either tray may serve as a base support for the other tray.

A separator, or sieve 21, having a frame 22, openwork 23 and handles 24, is positionable within the topmost of the trays 11 and 12 when they are nested, and rests on the bottom 15. The frame 22 is of similar configuration as the bottom 15, but is of slightly less dimension than the bottom 15, so that it will readily fit within the walls 13, 13' and 14. When the frame 22 is resting on the bottom 15, the handles 24 extend above the top edge of the sides 13, 13' and 14, so that said handles may be readily grasped. The openwork 23 is made of molded plastic having openings 25 interspersed with flat surfaces 26. The openings 25 may also be punched from stainless steel or other non-corrosive sheet material, to leave the broad, blunt surfaces 26. The openings 25 permit the sand to sift through the separator 21, and the broad surfaces 26 present a non-cutting support to the feces so that the latter will not be severed when the separator is lifted. Openwork of small gauge woven wire would not be suitable for the separator 21, since the small gauge wire would slice through the feces rather than support them for removal from the sand. The openings 25 are relatively large with respect to the sand particles so that the sand will quickly flow through these openings, but they are small enough to prevent passage of the feces. The handles 24 are attached one to each of the rectilinear portions of the frame 22, as shown in Figure 1. The frame 22, openwork 23 and handles 24 may be cast integrally of plastic or the like, or the handles 24 may be separately formed of a suitable material, such as large gauge stainless steel wire and bolted or otherwise sturdily attached to the frame in any well known manner.

The trays 11 and 12, and separator 21 are assembled as shown in Figure 2. In this case the tray 11 supports the tray 12 and the separator 21 is placed in the tray 12 with the openwork 23 superposed on the bottom 15. A granular absorbent deodorizing material 27, referred to herein as sand, of any of the well-known types available on the market, is poured in the tray 12 on top of the separator 21.

The shape of the box 10 used for illustrating the invention permits it to be placed in a corner of a room. In this location it is removed from the portion of the room where people normally walk, and therefore, the possibility of anyone inadvertently stepping on it is avoided.

Each of the trays 11 and 12 are provided with an outwardly extending lip, or step 28, disposed about the top edge of the curvilinear side 14. The lip 28 provides a firm footing for the pet when entering or leaving the box. To further improve the footing to avoid slipping, the top 29 of the lip may be roughened, as where plastic is used, by placing an abrasive 30 in the casting mold, so that it will be embedded on the top surface of the lip 28. By thus providing a roughened step-like lip on the trays, the curved side of the tray is reinforced and the animal will use this footing instead of vaulting over the edge of the tray.

When the box has been set up as previously described, having the base tray 11 supporting the sand tray 12 and the separator 21 positioned in the sand tray with the sand on top of the openwork 23 of the separator, and pets have used it for a period of time, such as a day, it becomes desirable to remove the animal dung from the sand. This may be easily done by grasping the handles of the separator and lifting it with reciprocating vertical vibration. The sand will pass through the open-work of the separator and the dung will be retained thereon. The dung can then be disposed of and the separator washed if necessary. The separator cannot be replaced in the same tray, since downward movement of the separator would compact the sand. Therefore, the sand tray 12 is removed from the base tray 11; the separator 21 is placed in the empty tray 11; and the sand is poured from the tray 12 into the tray 11 on top of the separator 21. The tray 12 then becomes the base tray and the tray 11 is nested on it and the box is ready for use. The removal of the separator and the pouring of the sand from one tray to the other distributes throughout the sand any excessive amount of moisture which may have collected in one place in the sand, and facilitates drying. The described removal of dung and the reversal of the trays is repeated periodically until the sand is spent.

While there has been disclosed in the foregoing a practical embodiment of a pet sand box made in accordance with the present invention, it will be understood by those skilled in the art that variations in the implementation of the concept of the invention are within the purview and scope of the invention.

What is claimed is:

1. A pet sand box in which the sanitary condition of said box may be improved by removing feces periodically comprising, a quadrant shaped tray having a bottom and sides joined to said bottom at their lower edges and having top edges spaced vertically therefrom, one of said sides being curvilinear, said curvilinear side having a lip extending outwardly from its top edge, and a sieve-like separator removably positioned on said bottom and being substantially coextensive therewith, upwardly extending removal means on said separator, said sieve-like separator having a broad blunt mesh so that when said sanitary condition of said box is improved by lifting said sieve-like separator the sand will sift through the mesh of said separator and the feces will be retained on the mesh of said separator uncut by the mesh.

2. An animal commode in which the sanitary condition of the commode may be periodically restored comprising first and second trays, each tray being provided with complementary means thereon to receive the other tray in superposed position and prevent relative lateral movement therebetween, and a sieve-like separator removably positioned on the bottom of the uppermost tray and substantially coextensive therewith, removal means on said separator, granular litter material in the bottom of said upper tray normally covering said separator, the construction and arrangement being such that said separator may be raised from the uppermost tray to remove solid fecal matter deposited thereon, the separator replaced into the second tray, the sand transferred into the second tray, and the trays reversed in superposed position.

3. A pet sand box in which the sanitary condition of said box may be periodically restored comprising, a pair of similar superposed trays having top and bottom edges, each of said trays having a pair of rectilinear sides having inner and outer ends, said sides being joined at their said inner ends to each other at right angles, a curvilinear side extending between said outer ends of said rectilinear sides, each of said trays having a rabbet extending circumferentially about its top edge and a ledge extending circumferentially about its bottom edge, said rabbeted edge of one of said trays cooperating with said ledge of the other of said trays to hold said trays against lateral displacement when the trays are superposed to provide an open sand tray and a base for said sand tray, a sieve-like separator having an area substantially equal to the area of one of said trays, removal means on said separator, and said sieve-like separator being removably positioned upon the bottom of said open tray.

4. An animal commode in which the sanitary condition of the commode may be periodically restored comprising, a base tray, a litter tray having similar shape and dimensions of said base tray, each of said trays having a rabbeted top edge and a ledge formed on the bottom edge, said rabbet of one of said trays cooperating with said ledge of the other of said trays to hold said trays against lateral displacement when the trays are superposed one on the other, and a sieve-like separator having an area equal to the area of one of said trays removably positioned on the bottom of said superposed tray, removal means on said separator and granular litter material in the bottom of said litter tray normally covering said separator.

5. A pet sand box in which the sanitary condition of the box may be periodically restored comprising, a base tray having two rectilinear sides having respectively a back end and a front end, said rectilinear sides being joined at a right angle at their back, a curvilinear side joined across the front ends of said rectilinear side, a sand tray having similar sides and shape as said base tray and superposable thereon, each of said trays having a top and bottom edge, a rabbet extending circumferentially about its top edge and a ledge extending circumferentially about its bottom edge, said rabbeted edge of one of said trays cooperating with said ledge of the other of said trays to hold said trays against lateral displacement when the trays are superposed, a separator having a sieve area substantially equal to the area of one of said trays removably positioned in said superposed tray, and removal means on said separator to facilitate removal of said separator.

6. A pet sand box in which the sanitary condition of the box may be periodically restored comprising, a pair of similar quadrant-shaped trays superposed one on the other to provide an open tray for holding sand and a base tray for supporting said open tray, one side of said quadrant-shaped tray being curvilinear, each of said trays having a lip extending outwardly from the top edge of its curvilinear side to provide a step for the entrance of said pet into said tray, a sieve-like separator having an area substantially equal to the area of one of said trays, removal means on said separator, and said sieve-like separator being removably positioned on the bottom of said supported open tray, and sand in the bottom of said open tray normally covering said separator.

7. A pet sand box in assembly kit form, a pair of similar quadrant-shaped trays superposed one on the other to provide an open tray for holding sand and a base for supporting said open tray, each of said trays having a lip extending outwardly from the top edge of its curvilinear side to provide a step for the entrance of the pet into said tray and for reinforcing said curvilinear side, complementary means for holding said trays against lateral displacement when they are superposed, a separator having openings interspersed with broad, blunt areas, said separator having an area substantially equal to the area of one of said trays, and removal means on said separator to facilitate removal of said separator from its normal position in the bottom of said sand holding open tray, said separator normally being covered with sand placed in the bottom of said open tray.

References Cited in the file of this patent

UNITED STATES PATENTS

| | | |
|---|---|---|
| 1,416,022 | Hartley | May 16, 1922 |
| 2,741,223 | Winborn | Apr. 10, 1956 |
| 2,765,772 | Innman | Oct. 9, 1956 |

FOREIGN PATENTS

| | | |
|---|---|---|
| 333,122 | Great Britain | Aug. 7, 1930 |